J. FROELICH.
GEAR WHEEL.
APPLICATION FILED DEC. 4, 1913.
1,159,486.
Patented Nov. 9, 1915.
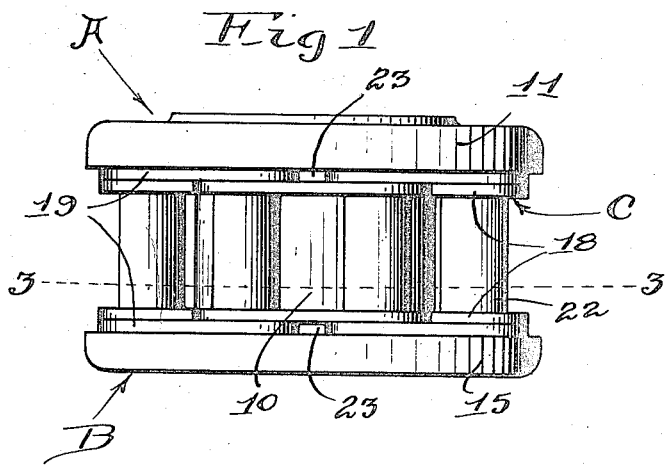
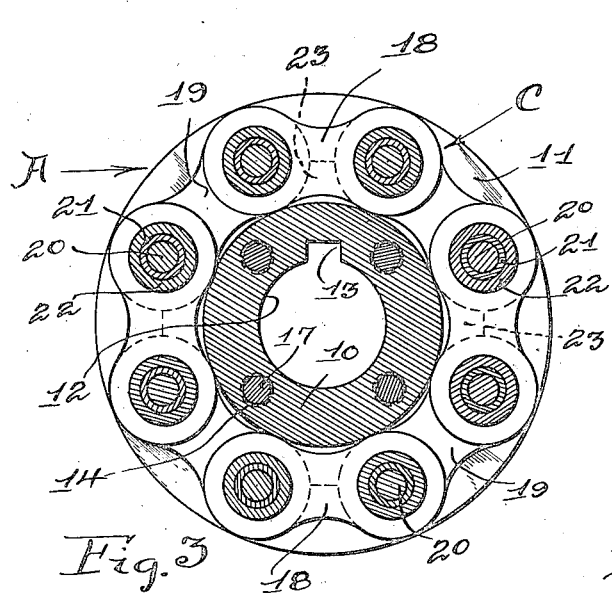
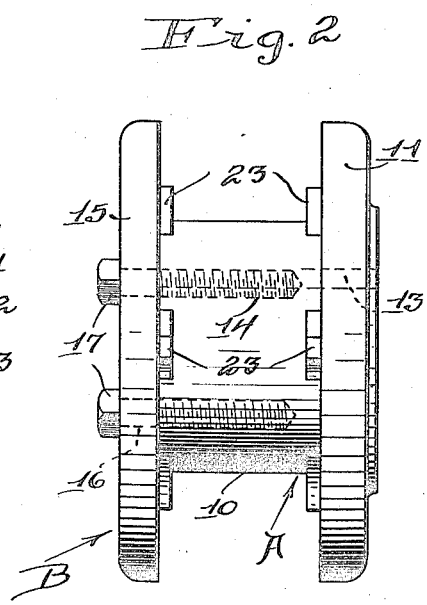
Witnesses
Inventor
John Froelich

UNITED STATES PATENT OFFICE.

JOHN FROELICH, OF ST. PAUL, MINNESOTA, ASSIGNOR TO LESLIE S. HACKNEY, OF ST. PAUL, MINNESOTA.

GEAR-WHEEL.

1,159,486.      Specification of Letters Patent.      Patented Nov. 9, 1915.

Application filed December 4, 1913. Serial No. 804,777.

*To all whom it may concern:*

Be it known that I, JOHN FROELICH, a citizen of the United States, residing at St. Paul, in the county of Ramsey and State of Minnesota, have invented new and useful Improvements in Gear-Wheels, of which the following is a specification.

My invention relates to an improvement in gear wheels. Its object is to provide an efficient and durable gear, silent in operation and having removable contact surfaces which are easily replaced when worn.

In the drawings, Figure 1 is a plan view of my improved gear; Fig. 2 is a plan view thereof with the face or meshing surfaces removed, and Fig. 3 is a sectional view taken on the line 3—3 of Fig. 1.

Referring to the drawings, I have used the reference letter A to indicate the body of the gear wheel B, a removable flange for said body, and C the removable annular, bearing surfaces of the gear. This bearing surface is formed by applying to said body a ring having transverse roller-like protuberances preferably in the form illustrated. This ring I illustrate as made up of a chain of the usual sprocket type. The body A consists of the cylindrical hub 10 and the annular flange 11 integral therewith. Said hub is formed with a smooth central bore 12 to receive a shaft and is also provided with a key seat 13. Spaced threaded bores 14 are formed in said hub parallel with the bore 12. The removable flange B comprises a disk 15 formed with perforations 16 arranged to register with the threaded bores 14 in said hub 10. Cap screws 17 are inserted through said perforations and threaded into the bores 14 to secure the flange B upon the body A. The chain C consists of two parallel series of inner and outer links 18 and 19 pivotally connected by pins 20. Each pin supports a bushing 21 and a roller 22 revoluble on said bushing. The chain C, when applied to the body A, forms a ring, fitting snugly over the hub 10 and between the flanges 11 and B, and its outer surface presents a plurality of spaced rollers on the periphery of the hub 10 which readily intermesh with ordinary spur gears or racks of corresponding pitch.

To prevent the ring C from slipping around the hub, I have provided a plurality of lugs 23 on the inner faces of the flanges 11 and B. These lugs are curved to conform to the ends of the outer chain links 19 and arranged to fit snugly between said links.

My improved gear wheel is adapted principally for use in connection with ordinary gears and racks having fixed teeth. It may be easily and inexpensively repaired because in case of wear, it is only necessary to replace a worn ring C with a new one. To accomplish this the flange B is detached from the hub 10 by removing the cap screws 17, when the worn ring is replaced by a new one and the flange B is attached to the hub by the screws 17.

Having described my invention, what I claim as new and desire to protect by Letters Patent, is:

A gear wheel comprising a cylindrical hub, annular flanges at the ends of said hub formed with lugs upon their inner faces, and an endless sprocket chain fitting snugly about the periphery of said hub and between said flanges, to form a removable bearing surface, said lugs being adapted to rest between and engage the ends of the outer links of said chain and secure the same from slipping on said hub.

In testimony whereof, I have signed my name to this specification in the presence of two subscribing witnesses.

JOHN FROELICH.

Witnesses:
    F. C. CASWELL,
    F. M. HARDY.